United States Patent
Feblowitz et al.

(10) Patent No.: US 8,166,465 B2
(45) Date of Patent: *Apr. 24, 2012

(54) METHOD AND SYSTEM FOR COMPOSING STREAM PROCESSING APPLICATIONS ACCORDING TO A SEMANTIC DESCRIPTION OF A PROCESSING GOAL

(75) Inventors: Mark D. Feblowitz, Winchester, MA (US); Zhen Liu, Tarrytown, NY (US); Anand Ranganathan, White Plains, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1422 days.

This patent is subject to a terminal disclaimer.

(21) Appl. No.: 11/695,410

(22) Filed: Apr. 2, 2007

(65) Prior Publication Data

US 2008/0244236 A1 Oct. 2, 2008

(51) Int. Cl.
*G06F 9/44* (2006.01)
*G06F 9/45* (2006.01)
*G06F 15/16* (2006.01)

(52) U.S. Cl. ........ 717/143; 717/144; 717/106; 717/107; 709/201; 709/231

(58) Field of Classification Search .................. None
See application file for complete search history.

(56) References Cited

U.S. PATENT DOCUMENTS

| | | | |
|---|---|---|---|
| 5,295,261 A | 3/1994 | Simonetti | |
| 5,675,786 A | 10/1997 | McKee et al. | |
| 6,086,619 A | 7/2000 | Hausman et al. | |
| 6,209,004 B1 | 3/2001 | Taylor | |
| 6,346,879 B1 | 2/2002 | Peled | |
| 6,523,174 B1 | 2/2003 | Gould et al. | |
| 6,640,231 B1 | 10/2003 | Andersen et al. | |
| 6,742,054 B1 | 5/2004 | Upton, IV | |
| 7,016,910 B2 | 3/2006 | Egilsson et al. | |
| 7,036,720 B2 | 5/2006 | Mezard et al. | |
| 7,150,400 B2 | 12/2006 | Melick et al. | |
| 7,155,720 B2 | 12/2006 | Casati et al. | |
| 7,505,989 B2 | 3/2009 | Gardner et al. | |
| 7,577,554 B2 | 8/2009 | Lystad et al. | |
| 7,665,064 B2 | 2/2010 | Able et al. | |
| 7,716,272 B2 | 5/2010 | Skwarek et al. | |

(Continued)

OTHER PUBLICATIONS

Klusch et al., "Semantic web service composition planning with owls-xplan," AAAI Fall Symposium on Semantic Web, 2005 aaai. org.*

(Continued)

*Primary Examiner* — Insun Kang
(74) *Attorney, Agent, or Firm* — William U. Stock; F. Chau & Associates, LLC

(57) ABSTRACT

A method for assembling a stream processing application in which data source descriptions, component descriptions and a stream processing request are input and used to assemble a stream processing graph. Each of the data source descriptions includes a graph pattern that semantically describes an output of a data source, each of the component descriptions includes a graph pattern that semantically describes an input of a component and a graph pattern that semantically describes an output of the component, the stream processing request includes a goal that is represented by a graph pattern that semantically describes a desired stream processing outcome and the stream processing graph includes at least one data source or at least one component that satisfies the desired processing outcome.

31 Claims, 9 Drawing Sheets

U.S. PATENT DOCUMENTS

| | | | |
|---|---|---|---|
| 7,739,351 | B2 | 6/2010 | Shkvarchuk et al. |
| 7,877,421 | B2 | 1/2011 | Berger et al. |
| 7,904,545 | B2* | 3/2011 | Golovchinsky et al. ...... 709/224 |
| 2003/0055668 | A1 | 3/2003 | Saran et al. |
| 2003/0120642 | A1 | 6/2003 | Egilsson et al. |
| 2003/0135628 | A1 | 7/2003 | Fletcher et al. |
| 2003/0142818 | A1 | 7/2003 | Raghunathan et al. |
| 2003/0149714 | A1 | 8/2003 | Casati et al. |
| 2004/0024841 | A1 | 2/2004 | Becker et al. |
| 2004/0054690 | A1 | 3/2004 | Hillerbrand et al. |
| 2004/0073545 | A1 | 4/2004 | Greenblatt et al. |
| 2004/0073661 | A1 | 4/2004 | Eibach et al. |
| 2004/0111533 | A1 | 6/2004 | Beisiegel et al. |
| 2004/0138936 | A1 | 7/2004 | Johnson et al. |
| 2004/0148214 | A1 | 7/2004 | Aziz et al. |
| 2004/0162741 | A1 | 8/2004 | Flaxer et al. |
| 2005/0021548 | A1 | 1/2005 | Bohannon et al. |
| 2005/0021745 | A1* | 1/2005 | Bookman et al. ............. 709/224 |
| 2005/0044525 | A1 | 2/2005 | Lazarov |
| 2005/0055330 | A1 | 3/2005 | Britton et al. |
| 2005/0093881 | A1 | 5/2005 | Okita et al. |
| 2005/0114757 | A1* | 5/2005 | Sahota et al. ............. 715/501.1 |
| 2005/0289134 | A1 | 12/2005 | Noguchi |
| 2006/0031288 | A1 | 2/2006 | Ter Horst et al. |
| 2006/0036983 | A1 | 2/2006 | Iwashita |
| 2006/0047638 | A1 | 3/2006 | Dettinger et al. |
| 2006/0053172 | A1 | 3/2006 | Gardner et al. |
| 2006/0167856 | A1 | 7/2006 | Angele et al. |
| 2006/0167946 | A1 | 7/2006 | Hellman et al. |
| 2006/0173868 | A1 | 8/2006 | Angele et al. |
| 2006/0195332 | A1 | 8/2006 | Bogner et al. |
| 2006/0195463 | A1 | 8/2006 | Bogner et al. |
| 2006/0200251 | A1* | 9/2006 | Gu et al. ........................... 700/1 |
| 2006/0212855 | A1 | 9/2006 | Bournas et al. |
| 2006/0236306 | A1 | 10/2006 | DeBruin et al. |
| 2007/0021995 | A1 | 1/2007 | Toklu et al. |
| 2007/0023515 | A1 | 2/2007 | Urken |
| 2007/0043803 | A1* | 2/2007 | Whitehouse et al. ......... 709/201 |
| 2007/0050227 | A1 | 3/2007 | Teegan et al. |
| 2007/0078815 | A1 | 4/2007 | Weng et al. |
| 2007/0156430 | A1 | 7/2007 | Kaetker et al. |
| 2007/0162893 | A1 | 7/2007 | Moosmann et al. |
| 2007/0168303 | A1 | 7/2007 | Moosmann et al. |
| 2007/0174811 | A1 | 7/2007 | Kaetker et al. |
| 2007/0179826 | A1 | 8/2007 | Cutlip et al. |
| 2007/0186209 | A1 | 8/2007 | Kaetker et al. |
| 2007/0198971 | A1 | 8/2007 | Dasu et al. |
| 2007/0220046 | A1 | 9/2007 | Moosmann et al. |
| 2007/0245013 | A1 | 10/2007 | Saraswathy et al. |
| 2007/0265862 | A1 | 11/2007 | Freund et al. |
| 2007/0288250 | A1 | 12/2007 | Lemcke et al. |
| 2008/0005155 | A1 | 1/2008 | Soma et al. |
| 2008/0005278 | A1* | 1/2008 | Betz et al. ...................... 709/219 |
| 2008/0120129 | A1 | 5/2008 | Seubert et al. |
| 2008/0127064 | A1* | 5/2008 | Orofino et al. ................ 717/108 |
| 2008/0161941 | A1 | 7/2008 | Strassner et al. |
| 2008/0243449 | A1 | 10/2008 | Feblowitz et al. |
| 2008/0250390 | A1 | 10/2008 | Feblowitz et al. |
| 2008/0288595 | A1 | 11/2008 | Liu et al. |
| 2010/0191521 | A1 | 7/2010 | Huet et al. |

OTHER PUBLICATIONS

SV Hashemian, A graph-based approach to web services composition, 2005, ieeexplore.ieee.org.*
L. Baresi and R. Heckel. Tutorial Introduction to Graph Transformation: A Software Engineering Perspective. In 1st Int. Conference on Graph Transformation, 2002.
D. Berardi, D. Calvanese, G.D. Giacomo, R. Hull, and M. Mecella. Automatic Composition of Transition-based Semantic Web Services with Messaging. In VLDB, 2005.
X.T. Nguyen, R. Kowalczyk, and M.T. Phan. Modelling and Solving QoS Composition Problem Using Fuzzy DisCSP. In ICWS, 2006.
J. Pathak, S. Basu and V. Honavar. Modeling Web Services by Iterative Reformulation of Functional and Non-functional Requirements. In ICSOC, 2006.
M. Pistore, P. Traverso, P. Bertoli, and A. Marconi. Automated Synthesis of Composite BPEL4WS Web Services. In ICWS, 2005.
K. Sivashanmugam, J. Miller, A. Sheth, and K. Verma. Framework for Semantic Web Process Composition. Special Issue of the Interl Journal of Electronic Commerce, 2003.
R. Berbner et al. Heuristics for Qo-S-aware Web Service Composition. In ICWS 2006.
A. Riabov and Z. Liu. Scalable Planning for Distributed Stream Processing Systems. In ICAPS, 2006.
R. Akkiraju et al. Semaplan: Combining planning with semantic matching to achieve web service composition. In ICWS, 2006.
M. Sullivan. Tribeca: A stream database manager for network traffic analysis. In Proc. of the 22nd Intl. Conf. on Very Large Data Bases, Sep. 1996.
M. LeLarge, Z. Liu, and A. Riabov. Automatic composition of secure workflows. In ATC-06, 2006.
J. Ambite and C. Knoblock. Flexible and scalable query planning in distributed and heterogeneous environments. In AIPS'98, Jun. 1998.
H.Wang and C. Zaniolo: ATLaS: A Native Extension of SQL for Data Mining and Stream Computations, UCLA CS Dept., Technical Report, Aug. 2002.
M. A. Hammad, W. G. Aref, and A. K. Elmagarmid. Stream window join: Tracking moving objects in sensor-network databases. In Proc. of the 15th SSDBM Conference, Jul. 2003.
C. Cranor et al. Gigascope: A stream database for network applications. In SIGMOD, 2003.
S. Chandrasekaran et al. TelegraphCQ: Continuous Dataflow Processing for an Uncertain World. CIDR, 2003.
D. J. Abadi, et al: Aurora: a new model and architecture for data stream management VLDB J. 12(2): 120-139 (2003).
Sheshagiri, M., desJardins, M., Finin, T.: A planner for composing services described in DAML-S. In: Web Services and Agent-based Engineering—AAMAS'03.
Lécué, F., Léger, A.: A formal model for semantic web service composition. In: ISWC. (2006).
Sirin, E., Parsia, B.: Planning for Semantic Web Services. In: Semantic Web Services Workshop at 3rd ISWC.
B. Parsia and E. Sirin. Pellet: An OWL DL reasoner. In The Semantic Web—ISWC 2004, 2004.
N. Jain et al. Design, implementation, and evaluation of the linear road benchmark on the stream processing core. In SIGMOD'06, Jun. 2006.
A. Riabov, Z. Liu, Planning for Stream Processing Systems, in Proceedings of AAAI-2005, Jul. 2005.
Y. Gil,, E. Deelman, J. Blythe, C. Kesselman, and H. Tangmunarunkit. Artificial intelligence and grids: Workflow planning and beyond. IEEE Intelligent Systems, Jan. 2004.
D. B. Terry et al. Continuous queries over append-only databases. In SIGMOD, pp. 321-330, 1992.
C-N Hsu and C .A. Knoblock. Semantic query optimization for query plans of heterogeneous multi-database systems, IEEE Transactions on Knowledge and Data Engineering, 12(6):959-978, Nov./Dec. 2000.
R. Ginis, R. Strom: An Autonomic Messaging Middleware with Stateful Stream Transformation, Proceedings of the International Conference on Autonomic Computing (ICAC'04).
A. Arasu, S. Babu, J. Widom. The CQL continuous query language: Semantic foundations and query execution. Technical Report 2003-67, Stanford University, 2003.
D.J. Abadi et al. The Design of the Borealis Stream Processing Engine (CIDR), Jan. 2005, Asilomar, CA.
Traverso, P., Pistore, M.: Automated composition of semantic web services into executable processes. In: ISWC. (2004).
Narayanan, S., McIlraith, S.: Simulation, verification and automated composition of web services. In: WWW. (2002).
Heflin, J., Munoz-Avila, H.: Low-based agent planning for the semantic web. In: Ontologies and the Semantic Web, 2002 AAAI Workshop.
Zhou, J., Ma, L., Liu, Q., Zhang, L., Yu, Y., Pan, Y.: Minerva: A scalable OWL ontology storage and inference system. In: 1st Asian Semantic Web Symp. (2004).
H. Knublauch, M. A. Musen, and A. L. Rector. Editing description logic ontologies with the protege owl plugin. Whistler, BC, Canada, 2004.

M. Stonebraker, U.çetintemel, S.B. Zdonik: The 8 requirements of real-time stream processing. SIGMOD Record 34(4): 42-47 (2005).
Grosof, B., Horrocks, I., Volz, R., Decker, S.: Description logic programs: combining logic programs with description logic. In: WWW'03. 48-57.
J. Heflin (2004). Web Ontology Language (OWL) use cases and requirements. W3C Recommendation Feb. 10, 2004. Available at: http://www.w3.org/TR/webont-req/.
European Office Action dated Aug. 18, 2010 in corresponding European Appln. No. 08 807 375.4-2212.
Nokia: "Nokia N95 User guide" Internet Citation, [Online] Aug. 2007, pp. 1-138, XP002498111 Retrieved from the Internet: URL:http://static.tigerdirect.com/pdf/NokiaN95usermanualUS.pdf [retrieved on Oct. 1, 2008].
"Adobe PDF Security—Understanding and Using Security Features with Adobe Reader and Adobe Acrobat" Internet Citation, [Online] XP003013727 Retrieved from the Internet: URL:http://www.adobe.com/products/pdfs/AdobePDFSecurityGuide-c.pdf [retrieve on Jan. 1, 2007].
Owen et al., "BPMN and Business Process Management: Introduction to the New Business Modeling Standard", Popkin Software 2003, pp. 1-27.
Martin et al., "Bringing Semantics to Web Services: The OWL-S Approach", SWSWPC 2004, vol. 3387 (2004), 17 pages.
Battle, "Boxes: black, white, grey and glass box views of web-services", HPL-2003-30, 2003, 9 pages.
Lemmens et al., "Semantic Description of Location based Web Services Using an Extensible Location Ontology", 2004, pp. 261-276.
Jos de Bruijin, "Semantic Web Technologies: Advanced SPARQL", published 2006, pp. 1-4. Accessed online at http://www.inf.unibz.it/~debruijin/teaching/swt/2006/lecture4-handouts-2x3.pdf on Sep. 22, 2009.
Nagarajan et al., "Semantic Interoperability of Web Services—Challenges and Experiences", 2006, pp. 1-8. Accessed online at http://lsdis.cs.uga.edu/library/download/techRep2-15-06.pdf on Sep. 22, 2009.
Fensel et al., "The Web Service Modeling Framework WSMF", Electronic Commerce Research and Applications 2002, pp. 1-33. Accessed online at http://www.wsmo.org/papers/publications/wsmf.paper.pdf on Sep. 22, 2009.
Ankolekar et al., "DAML-S: Semantic Markup for Web Services", 2001, pp. 1-20. Accessed online at http://cimic.rutgers.edu/~ahgomaa/mmis/semantic_markup.pdf on Sep. 22, 2009.
Liu et al., "Modeling Web Services using semantic Graph Transformation to aid Automatic Composition", 2007, pp. 1-8. Accessed online at http://choices.cs.uiuc.edu/~ranganat/Pubs/ranganathan_A_Modeling.pdf on Sep. 22, 2009.

* cited by examiner

METHOD AND SYSTEM FOR COMPOSING STREAM PROCESSING APPLICATIONS ACCORDING TO A SEMANTIC DESCRIPTION OF A PROCESSING GOAL

GOVERNMENT INTERESTS

This invention was made with Government support under Contract No. H98230-05-3-0001 awarded by the U.S. Department of Defense. The Government has certain rights in this invention.

RELATED APPLICATIONS

This application is related to: commonly assigned U.S. application entitled "METHOD AND SYSTEM FOR ASSEMBLING INFORMATION PROCESSING APPLICATIONS BASED ON DECLARATIVE SEMANTIC SPECIFICATIONS," which is currently pending with application Ser. No. 11/695,238, and is incorporated by reference herein in its entirety; commonly assigned U.S. application entitled "METHOD AND SYSTEM FOR AUTOMATICALLY ASSEMBLING STREAM PROCESSING GRAPHS IN STREAM PROCESSING SYSTEMS," which issued as U.S. Pat. No. 7,834,875, and is incorporated by reference herein in its entirety; commonly assigned U.S. application entitled "METHOD FOR SEMANTIC MODELING OF STREAM PROCESSING COMPONENTS TO ENABLE AUTOMATIC APPLICATION COMPOSITION," which is currently pending with application Ser. No. 11/695,157, and is incorporated by reference herein in its entirety; commonly assigned U.S. application entitled "METHOD FOR DECLARATIVE SEMANTIC EXPRESSION OF USER INTENT TO ENABLE GOAL-DRIVEN STREAM PROCESSING," which issued as U.S. Pat. No. 7,899,861, and is incorporated by reference herein in its entirety; commonly assigned U.S. application entitled "METHOD AND SYSTEM FOR AUTOMATICALLY ASSEMBLING PROCESSING GRAPHS IN INFORMATION PROCESSING SYSTEMS," which is currently pending with application Ser. No. 11/695,349, and is incorporated by reference herein in its entirety; commonly assigned U.S. application entitled "METHOD FOR MODELING COMPONENTS OF AN INFORMATION PROCESSING APPLICATION USING SEMANTIC GRAPH TRANSFORMATIONS," which issued as U.S. Pat. No. 7,882,485, and is incorporated by reference herein in its entirety; and commonly assigned U.S. application entitled "METHOD FOR DECLARATIVE SEMANTIC EXPRESSION OF USER INTENT TO ENABLE GOAL-DRIVEN INFORMATION PROCESSING," which is currently pending with application Ser. No. 11/695,279, and is incorporated by reference herein in its entirety.

BACKGROUND OF THE INVENTION

1. Technical Field

The present invention relates to composing stream processing applications, and more particularly, to a method and system for composing stream processing applications according to a semantic description of a processing goal.

2. Discussion of the Related Art

Stream processing systems are information processing systems that operate on data at high input data rates. When under heavy load, these systems generally do not have the resources to store all arriving data, and thus, must perform some amount of processing before storing a smaller subset of the incoming data and/or presenting result data to end users. Generally, stream processing systems execute stream processing applications that are an assembled collection of data components (e.g., data sources and processing elements) interconnected by communication channels (e.g., streams). At run time, the assembly of data processing components, which together constitute a stream processing graph, are deployed to one or more computers connected by a network. The data leaving one or more data sources is then sent to one or more components, and the data produced by the components is sent to other components, according to the configuration of the processing graph.

The stream processing system can produce a variety of different results depending on how components of the application are interconnected, which components and which data sources are included in the processing graph, and how the components of the processing graph are configured. Generally, end users working with the system can easily describe their requirements on the outputs produced by the application, but the same users do not have the expertise required to select the components and connect them such that the resulting stream processing application would produce the required results.

Recent advances in Semantic Web technologies have provided formal methods and standards for representing knowledge. Resource Description Framework (RDF), W3C Recommendation 10 Feb. 2004, and more recently, Web Ontology Language (OWL), are standards that are used for describing ontologies. OWL is an extension of RDF that in addition to basic RDF includes inferencing capabilities provided by reasoners, for example, a Description Logic (DL) reasoner.

The knowledge represented in RDF or OWL can be queried using SPARQL Query Language for RDF, W3C Candidate Rec., which is a language for expressing queries against semantically described data (e.g., data described using RDF graphs). SPARQL queries are stated by designating result variables and by describing, using semantic graph patterns, the characteristics of things (e.g., RDF resources or OWL individuals) that could be suitable values for the results. The descriptions are expressed as a graph comprised of RDF triples, depicting the relationships connecting these variables with other variables of with other resources. If any subgraphs of the RDF graph are found to match the desired relationships, the corresponding assignment of variables is included in the result set of the query, with each assignment constituting a row in the result set.

Various stream processing architectures and systems exist or are being developed that provide a means of querying ephemeral streaming data. However, most of these systems assume that the input streams contain structured data. In addition, most of these systems focus on conventional relational operators and sliding-window operators. Relational and time-windowed analyses are necessary in a streaming environment. However, stream processing applications may need to perform other kinds of operations in order to process the likely unstructured, streaming data (e.g., raw sensor data, video or audio signals, etc.) into a meaningful response. Such operations include annotation, classification, transformation, aggregation, and filtering of specific kinds of data in the streams. While some of these operations are expressible in relational algebra, expressing all of the needed stream processing functions would require a user with needed deep knowledge of both problem and solution domains and could result in extremely detailed, possibly over-constrained queries/procedures that combine problem and solution descriptions.

Another challenge for stream processing systems lies in the construction of processing graphs that can satisfy user queries. With large numbers of disparate data sources and processing elements to choose from, we cannot expect the end-user to craft these graphs manually. The set of processing elements and data sources can also change dynamically as new sources are discovered or new processing elements are developed. Different end-users express widely varying queries, requiring a large number of different graphs to be constructed. Since there is an exponential number of possible graphs for a given number of data sources and processing elements, it is not feasible to pre-construct all the graphs, manually, to satisfy the wide variety of end-user queries.

SUMMARY OF THE INVENTION

In an exemplary embodiment of the present invention, a method for assembling a stream processing application, comprises: inputting a plurality of data source descriptions, wherein each of the data source descriptions includes a graph pattern that semantically describes an output of a data source; inputting a plurality of component descriptions, wherein each of the component descriptions includes a graph pattern that semantically describes an input of a component and a graph pattern that semantically describes an output of the component; inputting a stream processing request, wherein the stream processing request includes a goal that is represented by a graph pattern that semantically describes a desired stream processing outcome; assembling a stream processing graph, wherein the stream processing graph includes at least one data source or at least one component that satisfies the desired processing outcome; and outputting the stream processing graph.

The graph pattern that semantically describes the output of the data source includes a description of an output capability of the data source. The graph pattern that semantically describes the input of the component includes a description of an input requirement of the component. The graph pattern that semantically describes the output of the component includes a description of an output capability of the component.

The graph pattern that semantically describes the output of the data source is represented in an ontology description language. The ontology description language is Resource Description Framework (RDF) or Web Ontology Language (OWL). The graph pattern that semantically describes the input of the component and the graph pattern that semantically describes the output of the component are represented in an ontology description language. The ontology description language is RDF or OWL.

The stream processing request further includes a constraint that is represented by a graph pattern that semantically describes constraints on the assembly of the stream processing graph.

The method further comprises: deploying a stream processing application embodying the at least one data source or the at least one component of the stream processing graph; and operating the stream processing application.

Result data is produced when operating the stream processing application. When the goal is a goal that requests the production of data, the stream processing request further includes a disposition that describes a means of handling the result data.

The stream processing request is encoded in a request specification language.

Assembling the stream processing graph comprises: determining if an output of a data source matches an input of a component; connecting the data source to the component if the output of the data source matches the input of the component; and determining a new output for the component when the data source and the component are connected to each other.

Assembling the stream processing graph comprises: determining if an output of a first component matches an input of a second component; connecting the first component to the second component if the output of the first component matches the input of the second component; and determining a new output of the second component when the first and second components are connected to each other.

In an exemplary embodiment of the present invention, a system for assembling a stream processing application, comprising: a memory device for storing a program; a processor in communication with the memory device, the processor operative with the program to: receive and compile a plurality of data source descriptions, wherein each of the data source descriptions includes a graph pattern that semantically describes an output of a data source; receive and compile a plurality of component descriptions, wherein each of the component descriptions includes a graph pattern that semantically describes an input of a component and a graph pattern that semantically describes an output of the component; receive and compile a stream processing request, wherein the stream processing request includes a goal that is represented by a graph pattern that semantically describes a desired stream processing outcome; assemble a stream processing graph, wherein the stream processing graph includes at least one data source or at least one component that satisfies the desired processing outcome; and output the stream processing graph.

The graph pattern that semantically describes the output of the data source includes a description of an output capability of the data source. The graph pattern that semantically describes the input of the component includes a description of an input requirement of the component. The graph pattern that semantically describes the output of the component includes a description of an output capability of the component.

The graph pattern that semantically describes the output of the data source is represented in an ontology description language. The ontology description language is RDF or OWL. The graph pattern that semantically describes the input of the component and the graph pattern that semantically describes the output of the component are represented in an ontology description language. The ontology description language is RDF or OWL.

The stream processing request further includes a constraint that is represented by a graph pattern that semantically describes constraints on the assembly of the stream processing graph.

The processor is further operative with the program to: deploy a stream processing application embodying the at least one data source or the at least one component of the stream processing graph; and operate the stream processing application.

Result data is produced when operating the stream processing application. When the goal is a goal that requests the production of data, the stream processing request further includes a disposition that describes a means of handling the result data.

The stream processing request is encoded in a request specification language.

The processor is further operative with the program when assembling the stream processing graph to: determine if an output of a data source matches an input of a component;

connect the data source to the component if the output of the data source matches the input of the component; and determine a new output for the component when the data source and the component are connected to each other.

The processor is further operative with the program when assembling the stream processing graph to: determine if an output of a first component matches an input of a second component; connect the first component to the second component if the output of the first component matches the input of the second component; and determine a new output of the second component when the first and second components are connected to each other.

In an exemplary embodiment of the present invention, a computer program product comprising a computer useable medium having computer program logic recorded thereon for assembling a stream processing application, the computer program logic comprises: program code for receiving and compiling a plurality of data source descriptions, wherein each of the data source descriptions includes a graph pattern that semantically describes an output of a data source; program code for receiving and compiling a plurality of component descriptions, wherein each of the component descriptions includes a graph pattern that semantically describes an input of a component and a graph pattern that semantically describes an output of the component; program code for receiving and compiling a stream processing request, wherein the stream processing request includes a goal that is represented by a graph pattern that semantically describes a desired stream processing outcome; and program code for assembling a stream processing graph, wherein the stream processing graph includes at least one data source or at least one component that satisfies the desired processing outcome.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
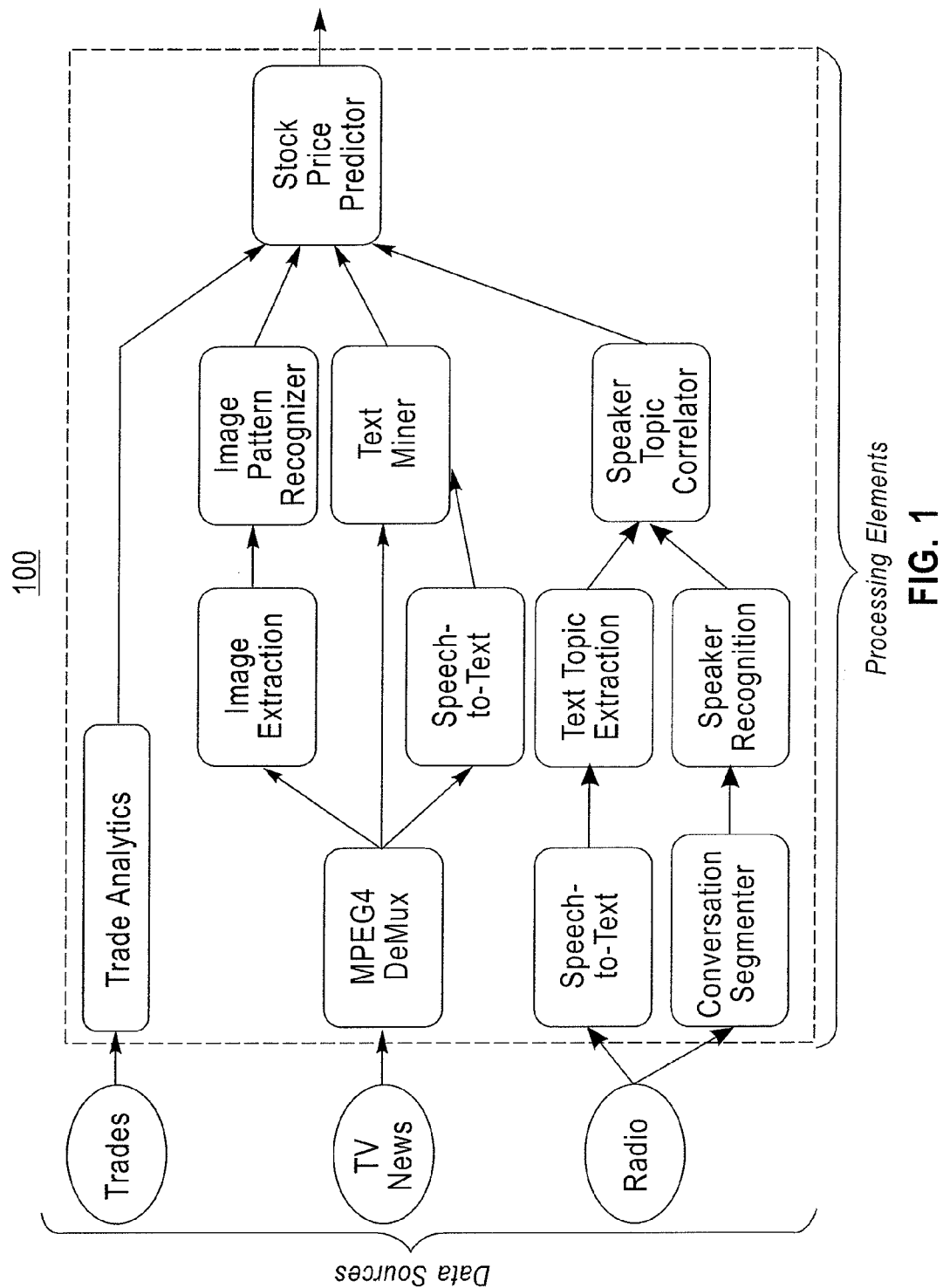
FIG. 1 illustrates a stream processing graph according to an exemplary embodiment of the present invention.

In accordance with an exemplary embodiment of the present invention, a method for conveying a desired outcome of one or more stream processing applications, using semantic descriptions of processing goals plus semantically described constraints on potential solutions is provided. The corresponding semantic descriptions, when specified according to the method and interpreted in the presence of semantically described stream processing components, are used by a planner/compiler to automatically assemble an information processing application to fulfill the request.

In this embodiment, semantic graph patterns are used to convey a user's goals and for constraining the means by which the outcomes are pursued, constraining, for example, both the data sources that are or are not to be drawn upon and the processing methods that are or are not to be used. In this manner, the goals and constraints prepared by the user do not convey in any direct way the mechanism by which the request is to be satisfied. This allows an automated stream processing application planner the freedom and flexibility to select from many alternative data sources and processing methods the ones that are best suited to request and best suited to the computational resources at the time of the request. In this way, stream processing components not envisioned by the user can be applied, potentially providing a higher quality result (or a result consuming fewer computational resources, or satisfying any of a number of desired processing characteristics) than can be selected by the user.

It is to be understood that since the principal type of request for information processing actions is the production of information content, the following description of exemplary embodiments of the present invention will focus on how the method is used to describe information production goals. However, since other types of outcomes (e.g., the modification of stored data or the initiation of a process) are also in the realm of desired outcomes, several other types of stream processing goals are envisioned for use with the present invention. Further, since the set of all processing outcomes is never completely known, the method provides a means of extending the set of defined outcomes, as well as a means of extending the set of constraints that may be imposed on the solutions.

In accordance with another exemplary embodiment of the present invention, a method for semantically describing stream processing components, which can be dynamically added to a system embodying the present invention, is provided. In accordance with yet another exemplary embodiment of the present invention, a method and system for processing all of these descriptions by using a planner/compiler is provided. Here, the planner/compiler interprets the desired outcomes, the descriptions of candidate data sources and processing methods, and produces one or more stream processing applications believed to be responsive to the semantically expressed intent.

Since a processing graph will be referred to when describing exemplary embodiments of the present invention, a description of a processing graph is now provided.

Processing Graph

A processing request is a semantically-expressed request for some processing to be performed in a stream processing system, by a stream processing application. Typically, this involves the observation and analysis of streaming data. Processing is performed, on-the-fly, on data from streaming data sources, producing a desired effect, for example, the production of requested information.

A running stream processing application observes data on streams emanating from a number of streaming data sources. On rare occasions, the data observed is exactly the data desired, but most often some amount of processing is required to identify and/or formulate the desired result. With structure, prepared source data such as that found on a Really Simple Syndication (RSS) feed, little or no data preparation is required before analytic processing can proceed. At the other extreme, the streaming data might be unstructured, requiring some amount of conditioning, classification, filtration, etc., before analytic processing can proceed.

To accommodate this spectrum of processing needs, processing is assumed to use multiple, stream-connectable software modules called processing elements. For a given request, it is possible to configure a collection of data sources and processing elements into a processing graph 100 (see FIG. 1) that can achieve the goal for the processing request.

A single request might draw from one or more data sources, and may filter, transform, aggregate, correlate, etc., the data to provide the desired result. Consider, for example, a stock prediction model (isolating the top thread in FIG. 1) that draws upon a single Trades data stream and applies a Trade Analytics component and a Stock Price Predictor component to produce a single Stock Price Prediction. In order to improve the accuracy of prediction, the application may analyze data from Trades, TV News, and Radio sources (as shown in FIG. 1), with the Stock Price Predictor component basing a prediction on feeds from each of the analytic chains, each conveying some information about the company in question.

As can be gleaned, for a given request, any number of such graphs could be assembled, each consuming possibly different amounts of computational resources, and each producing some desired result, at different levels of result quality. Manually assembling such a graph from a large library of components can be a daunting task. Preparing many such graphs in order to choose the top performers for given resource consumption levels is not practicable. Thus, a means of automatically assembling such processing graphs, given a machine-interpretable specification of the request's goal and a collection of machine-interpretable descriptions of the data sources and processing elements, that could, when properly assembled, be used to produce the desired results was developed.

It is to be understood that all stream processing applications process streams of data. In most cases, data streams are produced. Any streaming data observed by or produced by a stream processing application is potentially accessible as result data, whether it be some intermediate result (primarily intended as an input to another downstream component) or a declared result produced in response to a stream processing request. Any described result data corresponds to a stream in the stream processing application that produces the data. However, since stream processing requests may request outcomes other than information production, it is conceivable that some stream processing applications will observe and process streaming data but not produce any streams that are of interest to the requestor.

A description of the exemplary embodiments of the present invention will now be provided in the following order: Specification of Processing Requests; Modeling Components using Semantic Graph Transformations; and Method and System for Automatic Composition of Stream Processing Applications.

Specification of Processing Requests

Users convey to a system embodying the present invention their desired stream processing outcomes via processing requests. Processing requests are expressed via request specifications encoded in a request specification language. The request specification language is a machine-interpretable encoding of the request. The specific encoding format is not important, so long as the requisite elements are described and conveyed, with enough formal, machine-interpretable descriptive content, so that they can be interpreted by a request compiler/planner. When feasible, the compiler automatically assembles an application believed capable of achieving the processing outcome conveyed in the request specification.

A request specification is a declarative semantic expression of the desired effects of running a stream processing application and the constraints under which the application is assembled. Request specifications carry the least amount of description needed to convey intent, without unnecessary detail of how the request is to be carried out. A request specification can be automatically transformed by a request compiler into an application that is represented as a processing graph.

Request specifications are built from semantic graph expressions, which are to be evaluated according to a semantic model of the concepts from a domain or domains of interest. Users first create such semantic models using an ontology description language such as Web Ontology Language-Description Logic (OWL-DL), W3C Rec. 10 Feb. 2004 (a copy of which is incorporated by reference herein in its entirety), describing the concept classes in their domain of interest and potential/required relationships between individuals/elements in those concept classes. Based on one or more of these semantic models, a user describing some stream processing outcome crafts a request goal as one more graph patterns expressed, for example, in SPARQL, that define and convey the intent of their request, along with additional constraints and/or preferences on how their request is to be satisfied. These constraints are also described using graph patterns.

Request specifications are authored by a user or some user agent and convey, at the very least, an expression of the goals for the processing request, for example, the goal of producing a notification that a particular company's stock value is anticipated to change by an amount greater than 5% of its current value, or non-information-production goals such as the goal of having a piece of software installed or having a particular device configured. The request specification may also contain constraints on how that goal is to be achieved, for example, to avoid the use of video surveillance cameras as data sources or to favor the use of K-means clustering algorithms.

The goals, along with the accompanying constraints, are processed by a stream processing application compiler, for example, a specialized artificial intelligence (AI) planner that treats these constrained goal specifications as end effects, deriving from them stream processing graphs, which are stream processing applications capable of achieving the user's intended stream processing outcome.

For example, consider a simple request to watch for factors that might anticipate a significant change in a company's stock price. The request might be expressed informally as "watch for changes greater than 5 percent in the stock price of company Breakfast Foods Group (ticker symbol BFG)."

BFG stock price prediction might be expressed as:

```
Request BFGStockActivityPrediction
    Produce
        Result
            With Elements
                ?PredictedStockPrice,
                ?PredictedPercentageChange
        Where
            ?Company    a BreakfastFoodsCompany ;
                        hasTicker BFG ;
                        hasStockPricePrediction
                        ?Prediction .
            ?Prediction a :StockPricePrediction ;
                        hasPredictedStockPrice
                        ?PredictedStockPrice ;
                        hasPercentChange
                        ?PredictedPercentageChange .
        ?PredictedStockPrice
                        a :MonetaryAmount .
        ?PredictedPercentageChange
                        a :PercentChange .
```

The request "BFG Stock Activity Prediction" has one goal, that is, to produce one result with two result elements, the variables ?PredictedStockPrice and ?PredictedPercentageChange.

Figure 2:
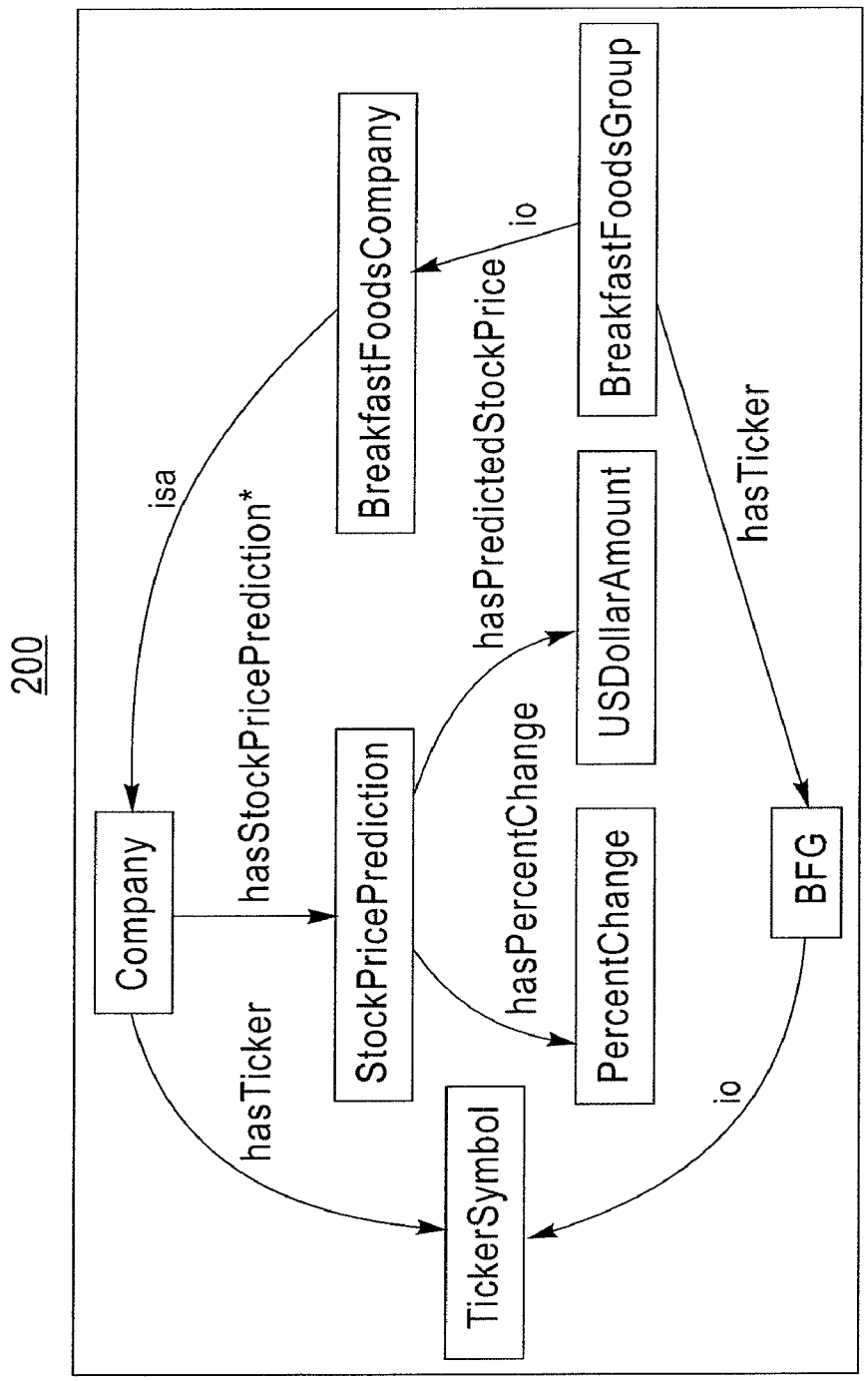
FIG. 2 illustrates a domain ontology fragment according to an exemplary embodiment of the present invention.

The request is written with a domain ontology in mind as shown, for example, by a domain ontology fragment 200 in FIG. 2, and states, that for a Breakfast Foods Company with Ticker symbol BFG, the elements ?PredictedStockPrice and ?PredictedPercentageChange are part of a ?Prediction associated with the company.

Produce goals optionally describe result disposition specifications, which are descriptions of what to do with the resulting data. Some result data is surfaced for further processing, some retained for later reference, some for export to external stores (database (DB), knowledgebase (KB), . . . ), and some for external reference, for example, via notification.

Results can be dealt with in a number of ways according to a set of disposition instructions. For example, to notify some interested person or their agent of the result, to persist the result for some specified amount of time, or to stream the result to some IP port on some remote host, etc. Multiple dispositions can be expressed for each declared result, and any disposition can be conditionally applied.

In the following produce goal, the result is persisted for one month (six months if the PredictedPercentageChange>=5 percentage points), and the inquirer will be notified via a default mechanism of any PredictedPercentageChange>=5 percentage points.

```
Request BFGStockActivityPrediction
    Produce
        Result
            With Elements
                ?PredictedStockPrice,
                ?PredictedPercentageChange
            With Dispositions
                persist for 1 month,
                notify if ?PredictedPercentageChange >= 5,
                persist for 6 months
                    if ?PredictedPercentageChange >= 5
```

Note that the request shown above neither specifies nor constrains the components to be used in the processing graph. This approach favors discovery of components, for example, individual algorithms or processing subgraphs, in an attempt to avoid over-constrained specifications. User designation of components is optional; the absence of such designations enables the request compiler to identify sources and methods that users may not have been aware of, or that may produce higher quality results than those produced by user-specified sources and methods.

However, a request specification can include constraints regarding various plan elements. Constraints convey a requestor's instructions to Prefer, Avoid, etc., specified plan elements such as Data Sources, Methods, etc. These expressions provide indirect guidance to the compiler (as soft constraints) on the assembly of processing graphs. Say, for example, a custom developed algorithm for interpreting stock ticker data is strongly preferred, or the use of any surveillance video is to be avoided:

```
Request BFGStockActivityPrediction
    Produce
        ...
    Prefer
        Method ?M
            Where
                ?M implementsAlgorithm
                    ProprietaryTradesAnalysisAlgorithm .
        DataSource ?STDFeed
            Where
                ?STD produces StockTickerData .
    Avoid
        DataSource ?SVFeed
            Where
                ?SVFeed produces SurveillanceVideo .
```

Constraints can be either hard (e.g., absolute), or soft (e.g., preferences). Hard constraints specifically require or prohibit some element or property of the solution. Soft constraints provide less strict guidance as to the composition of the processing graph. The use of preferences rather than absolute designations allows for the discovery of better alternative solutions in the context of user preferences and is thus favored for this method. Using only soft constraints, the request specification can guide choices a compiler might make, requiring user knowledge only of the items to be constrained but not of how the processing graph is assembled. But, because hard constraints are sometimes required, the method also provides a means of expressing such constraints.

The ontology in this example defines a property of Company called hasStockPricePrediction with a range StockPricePrediction. This value of this property is not likely to be available from a data source. More likely, a combination of components capable of producing such a result would be needed to establish that relation and populate the remainder of the price prediction submodel, for example, the hasPredictedStockPrice and the hasPercentChange properties.

While subtle, this is a key element for operator extensibility. For example, rather than enriching a language with function calls accessing user-provided code modules, request specifications declaratively express the goal or goals of analysis via concepts and relations in the ontologies. So, rather than calling a function to perform a task, request specifications describe a result that can be achieved by assembling a processing graph that can produce the result. Thus, a goal-specified, declarative description is used, rather than a function invoked in a query expression. Further, instead of requiring the requestor to describe the operations needed to calculate a ?PredictedPercentChange, some processing graph is automatically assembled to produce the result, composed from the needed operators, for example, the data sources and software components that jointly surface the requested data.

Request specifications can be expressed and conveyed in a textual form, as depicted in the BFG example above. Since request specifications are expected to be produced and consumed mostly by tools, the predominant representation is expected to be an XML encoding, conformant to an XML Schema, W3C Rec. 28 Oct. 2004, a copy of which is incorporated by reference herein in its entirety.

Modeling Components Using Semantic Graph Transformations

For stream processing graph assembly to be automatable, machine-interpretable semantic descriptions of components' functional characteristics are needed. Here, the focus is on black-box descriptions of each component, providing semantic descriptions of the input requirements and output capabilities of each component and the output capabilities of each data source. Any machine-interpretable description of a component's functional capabilities can be considered, so long as there is a means by which those descriptions can be used by a planner/compiler to create a suitable processing graph.

Inputs and outputs are modeled using semantic graph patterns. These graphs describe the objects conveyed between components and describe relationships with other specified objects. The graphs associated with a given component's inputs describe constraints that input data must satisfy in order for the component to work correctly. Hence, the descriptions are used to determine which other components can provide input data to the component, forming the basis for automated assembly of processing graphs.

These descriptions are represented using a semantic description technique, for example, OWL-DL. Reasoning at an expressivity similar to DL reasoning is essential in the graph assembly process, if any but the most trivial matching is to be pursued.

Representation of Semantic Descriptions

Semantic descriptions consist of processing component descriptions and descriptions of the data produced/required by the components. Processing component descriptions are based on core concepts defined in the system ontologies, and the data descriptions are based on sets of domain and shared ontologies. The system ontologies define concepts such as DataSource, and SoftwareComponent, and the relations, produces, requires, and contains. Expressed below in RDF N3 format is an excerpt of an exemplary OWL representation:

```
:DataSource        a           owl:Class ;
                   :produces   :Output Stream .
:SoftwareComponent a           owl:Class ;
                   :requires   :Input Stream ;
                   :produces   :Output Stream .
:Output            :contains   owl:Thing .
```

From these basic building blocks, specific Data Source, Software Component, Input and Output prototypes can be defined, each describing specific Data Source, Input, Output, and Software Component exemplars such as DataSource:HubbleEarthImageSource_1 and SoftwareComponent:ImagePatternRecognizer_1, and their respective inputs and outputs.

The contains relation for input and outputs, provides the mechanism for associating to a component semantic description of data to be carried on its inputs and/or outputs.

Figure 3:
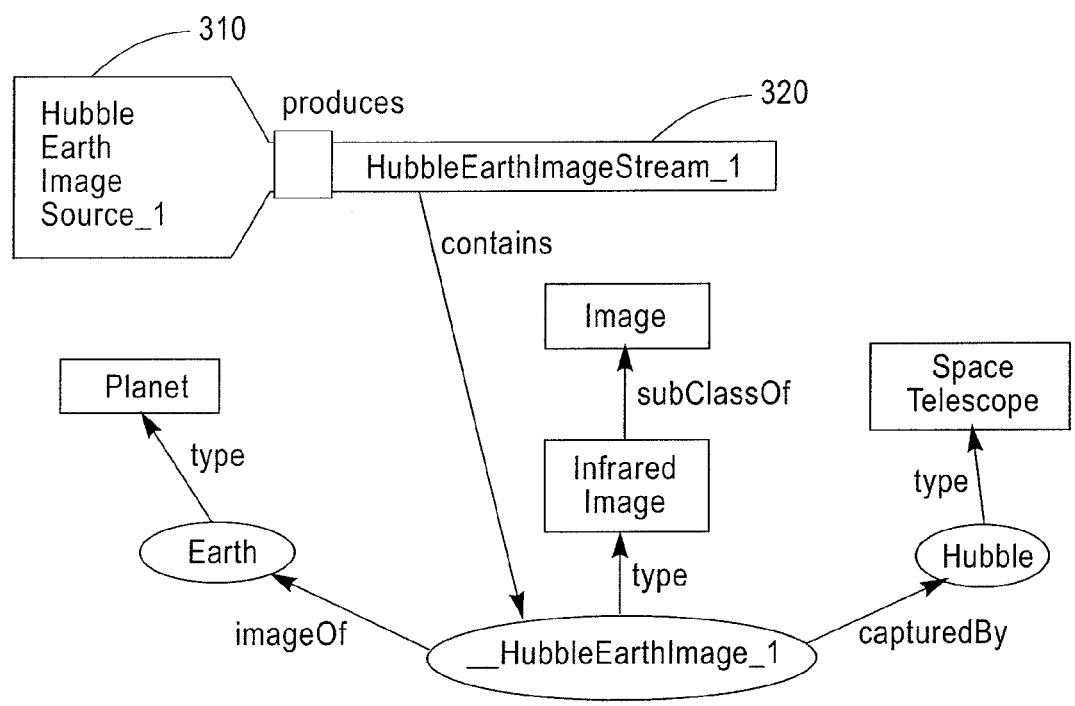
FIG. 3 illustrates a data source semantic description according to an exemplary embodiment of the present invention.

In FIG. 3, HubbleEarthImageSource_1, a DataSource 310, produces an Output 320 that contains HubbleEarthImage_1, an individual in the class InfraredImage:

```
:HubbleEarthImageSource__1
            a        :DataSource ;
            :produces :HubbleEarthImageStream__1 .
:HubbleEarthImageStream__1
            a        :OutputStream ;
            :contains :HubbleEarthImage__1 .
:HubbleEarthImage__1
            a        :InfraredImage ;
            :imageOf :Earth ;
            :capturedBy :Hubble ;
            a        :Variable ;
        a   :Exemplar.
```

The use of the double underscores ("___") in ___HubbleEarthImage_1 is a graphical shorthand indicating that Image_1 is also a Variable and an Exemplar, represented above as being of type Variable and of type Exemplar (both of which are special classes defined in the system ontology). The ___HubbleEarthImage_1 is an Exemplar that can take the value of an individual in the class InfraredImage and that has the appropriate capturedBy and imageOf properties associated therewith. Note that Hubble and Earth do not really appear in the output; instead, they are semantic descriptions of the ___HubbleEarthImage_1 data, which appears in the output. Hence, the contains relation is a special relation, that is, only those data items that the output explicitly describes using the contains relation are actually contained in the output. The remainder of the objects (Earth), while not contained in the output, form a rich semantic description of the objects contained in the output, for example, ___HubbleEarthImage_1.

Figure 4:
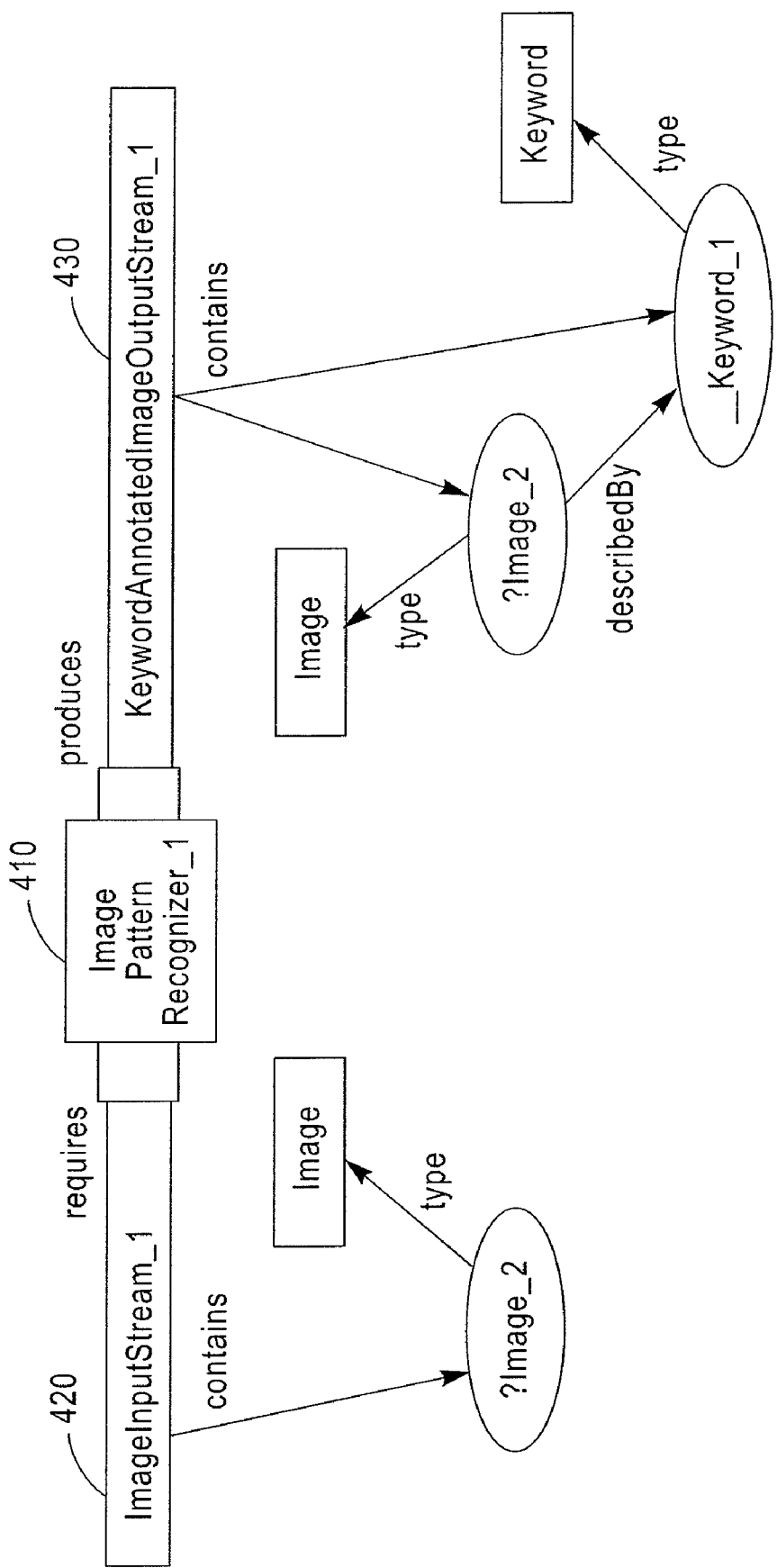
FIG. 4 illustrates a component semantic description according to an exemplary embodiment of the present invention.

Software components are described as requiring some number of inputs and producing some number of outputs. An ImagePatternRecognizer processing component, for example, ImagePatternRecognizer_1 410 in FIG. 4, is defined as requiring one input stream 420 containing ?Image_2, an Image, and as producing a single output stream 430 containing ?Image_2, and a Keyword___Keyword_1, such that ?Image_2 is describedBy Keyword_1. Here the "?" preceding Image_2 is a graphical notation that Image_2 is a Variable (not an Exemplar). This means that the ImagePatterRecognizer_1 requires an input object represented by a variable ?Image_2 and produces the same ?Image_2 as an output object annotated by a new thing, for example, ___Keyword_1.

The ImagePatternRecognizer_1 is defined to perform a few functions, that is, it conveys a known Image from input to output, it creates a new object (Exemplar), for example, a Keyword, and it establishes a new relation, describedBy.

Method and System for Automatic Composition of Stream Processing Applications

In order to connect two components together, it is first determined if the output of a first component can be connected to the input of a second component, and once the components are connected to each other, the resulting output produced by the second software component is then determined.

Given the descriptions of inputs and outputs of components, a process for determining if an output of a first component can be matched to an input of a second component will now be described. The component matching problem is treated as a graph embedding problem in which the question, "Can the graph describing the input be embedded in a graph describing another component's output?" is answered. This approach is different from traditional approaches where matching is generally based on simple type-checking alone.

The graph embedding approach is more powerful, building on the expressivity of semantic graphs.

To formally describe the component matching problem, let $G_I=(V_I, C_I, E_I)$ represent the input graph where $V_I$ is the set of variable modules, $C_I$ is the set of non-variable of constant nodes, and $E_I$ is the set of edges of the form $\{u, p, v\}$ where node u is related to node v through property p. Similarly, let $G_O=(V_O, C_O, E_O)$ represent the output graph. Note that $G_I$ and $G_O$ are directed graphs.

$G_I$ can be embedded in $G_O$ if there exists a graph homomorphism f: $G_I \rightarrow G_O$, that is, there is a mapping f: $V_I \cup C_I \rightarrow V_O \cup C_O$ such that if $\{u, p, v\} \in E_I$ then $\{f(u), f(p), f(v)\} \in E_O$. In addition, for any $x \in C_I$, $f(x)=x$. This means that constant nodes can only be mapped to equivalent constant nodes in the other graph, while variable nodes can be mapped to other variable nodes or constant nodes.

In addition, DL reasoning is applied to the output graphs to enable more flexible matching. In other words, graph $G_O$ is expanded with the results of DL reasoning to create graph $G_O'$. Graph $G_I$ is then checked to see if it can be embedded in $G_O'$. The use of reasoning provides a matching process that is capable of connecting components, even if the inputs and outputs are described using different terms. DL reasoning allows inferring new facts based on definitions in the ontology such as subclass and subproperty relationships, transitive, symmetric, inverse and functional properties, property restrictions, equality and inequality statements, etc.

Figure 5:
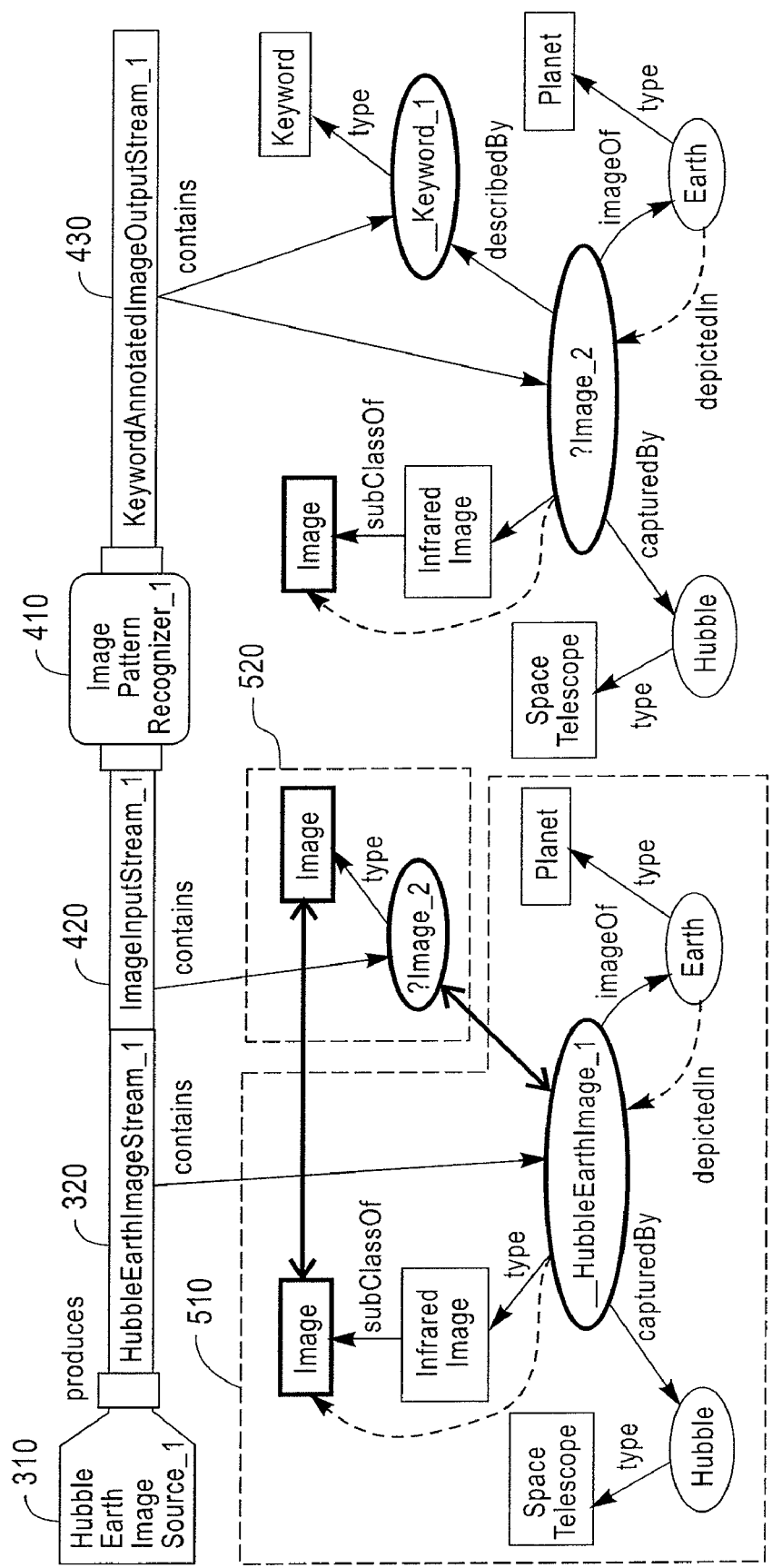
FIG. 5 illustrates a data source connected to a component according to an exemplary embodiment of the present invention.

For example, as shown in FIG. 5, an output graph 510 from HubbleEarthImageSource_1 310 is first expanded to include the results of DL reasoning. As a result, a type link is added from ___HubbleEarthImage_1 to Image (this is obtained from the subclass relationship between InfraredImage and Image). Also, a "depictedIn" link is added from Earth to ___HubbleEarthImage_1 (depictedIn defined as an inverse property of imageOf). Next, the matching process finds a homomorphism from an input graph 520 of the ImagePatternRecognizer 410 to the output graph 510 of HubbleEarthImageSource_1. In this homomorphism, ?Image_2 is mapped to ___HubbleEarthImage_1 (since they are both variables) and Image is mapped to Image (since they are both the same concept). Hence, the matching process determines that there is a match.

Determining the Output of a Component

To help determine the output of a component as a result of drawing data from the outputs of other components, a formal functional model of the component is defined. In the model, the component can be viewed as performing a graph transformation on the semantic graphs on the inputs to produce semantic graphs on the outputs.

Let $$\overline{L} = \bigcup_{i=1}^{m} L_i \text{ and } \overline{R} = \bigcup_{j=1}^{n} R_j.$$

The component implements a graph transformation described in the OWL ontology: pe: $\overline{L} \rightarrow \overline{R}$.

Note that there may be an overlap between $\overline{L}$ and $\overline{R}$. Now assume that the m input graphs have been matched to m outputs generated by other components, that is, $L_i$ is matched to $X_i$ for i=1 ... m. The outputs $Y_j$ coming from this component are determined as a result of connecting the inputs $X_i$ to the component using a graph homomorphism, $$f: \overline{L} \cup \overline{R} \rightarrow \overline{X} \cup \overline{Y} \text{ where } \overline{X} = \bigcup_{i=1}^{m} X_i \text{ \& } \overline{Y} = \bigcup_{j=1}^{n} Y_j.$$

In the model of the components, f satisfies the following properties (for i=1 ... m and j=1 ... n):

1. $f(L_i) \subset X_i$. This is acquired from the previous step that matched the components.
2. $f(R_j) \subset Y_j$.
3. $f(\overline{L} \backslash \overline{R}) = f(\overline{X} \backslash \overline{Y})$ and $f(\overline{R} \backslash \overline{L}) = f(\overline{Y} \backslash \overline{X})$, where "\" represents the graph difference operation. This means that exactly that part of $\overline{X}$ is deleted which is matched by elements of $\overline{L}$ not in $\overline{R}$, and exactly that part of $\overline{Y}$ is created that is matched by elements new in $\overline{R}$.

Using properties 2 and 3, the outputs, $Y_j$, of a component can be determined as a result of connecting $X_i$ to the component. An example of this process is shown in FIG. 5, where the output 430 of the ImagePatternRecognizer_1 410 is generated based on the input 320 that is connected to the ImagePatternRecognizer_1 410.

Composition Process

A semantic planner for automatically generating stream processing graphs from processing requests and semantic descriptions of components will now be discussed. The semantic planner enhances traditional AI planning techniques to plan in domains expressed in ontologies. Processing requests, in this case, user queries, are expressed as semantic graph patterns. The planner recursively connects components to each other using the methods described above until it arrives at an outcome description that can be matched to the request specification, or until no new output descriptions can be produced. In addition, the planner satisfies various constraints such as privacy and security, and produces optimal plans for a given resource consumption range.

Figure 6:
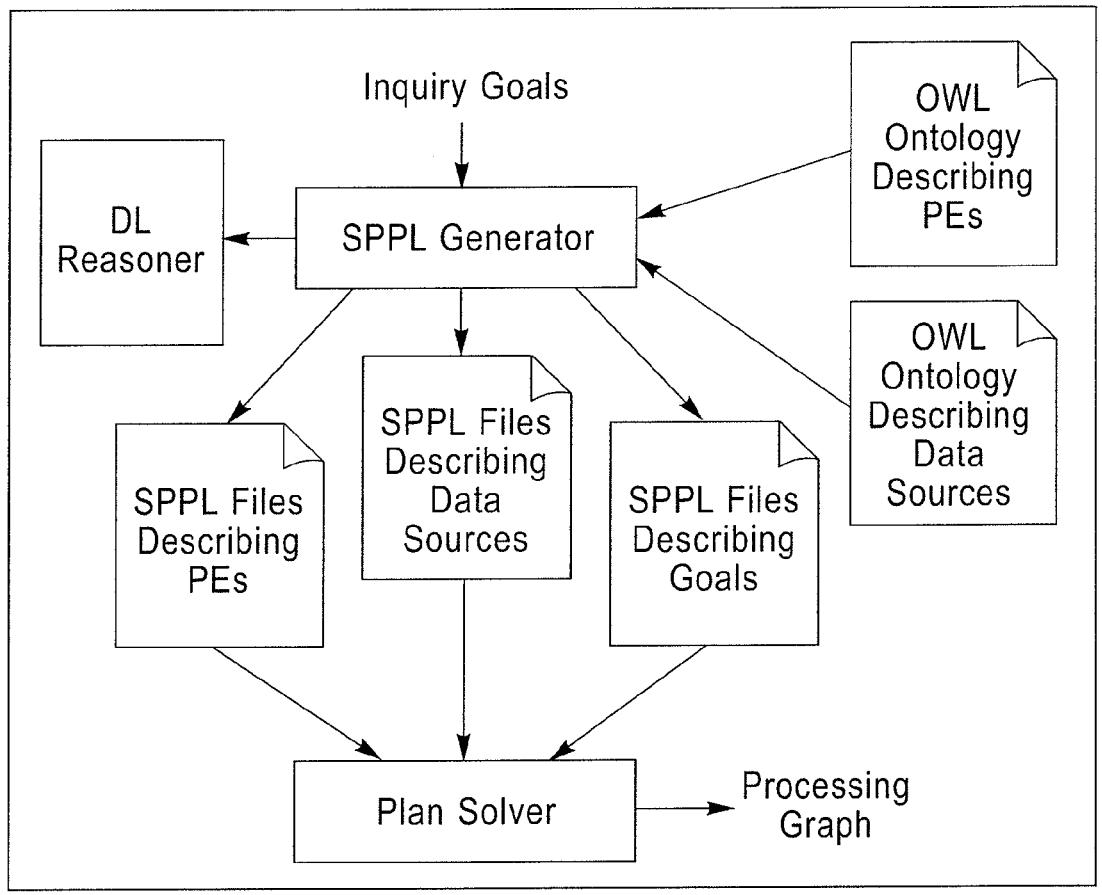
FIG. 6 illustrates a semantic planner according to an exemplary embodiment of the present invention.

As shown in FIG. 6, an exemplary semantic planner 600 consists of three main components: a Stream Processing Planning Language (SPPL) Generator, a DL, Reasoner and a Plan Solver. The SPPL Generator takes OWL files describing processing components and data sources and compiles them into a planning domain represented in the intermediate language SPPL as described, for example, in A. Riabov, Z. Liu, Planning for Stream Processing Systems, in Proceeding of AAAI-2005, July 2005, a copy of which is incorporated by reference herein in its entirety.

The SPPL Generator makes use of the DL Reasoner to make inferences about the software component descriptions and inserts these inferences as facts into the domain description. In addition to semantic descriptions of inputs and outputs, the planning domain also includes descriptions of other compositional/operational constraints such as security and privacy constraints. In addition to creating the domain file, the SPPL Generator translates each stream query into a goal description in SPPL. The Plan Solver then parses the generated domain and problem SPPL files and produces optimal plans using a backward-chaining branch and bound algorithm as described, for example, A. Riabov, Z. Liu, Planning for Stream Processing Systems, in Proceeding of AAAI-2005, July 2005. The Plan Solver solves the graph embedding problem by deducing appropriate mappings of variables in the input graph to nodes in the output graph. In this planning process multi-objective optimization is carried out including, for example, computational cost and result quality. A Minerva Reasoner, which is a highly scalable reasoner, operating on a description logic program (DLP), which is an expressive subset of DL, may be used as the DL Reasoner.

When the planner 600 is given a processing request, the planner 600 searches for multiple alternative plans, visiting processing component descriptions and traversing potentially large associated input and output description graphs many times. Incurring the overhead of DL reasoning on each visit could have a huge negative impact on performance. This is overcome by adopting a two-phase approach, performing a priori reasoning over graphs of asserted and inferred facts, caching expanded graphs for later use during query compilation. Because the products of the reasoning have been cached, no DL reasoning need be used while searching for viable processing graphs.

Figure 7A:
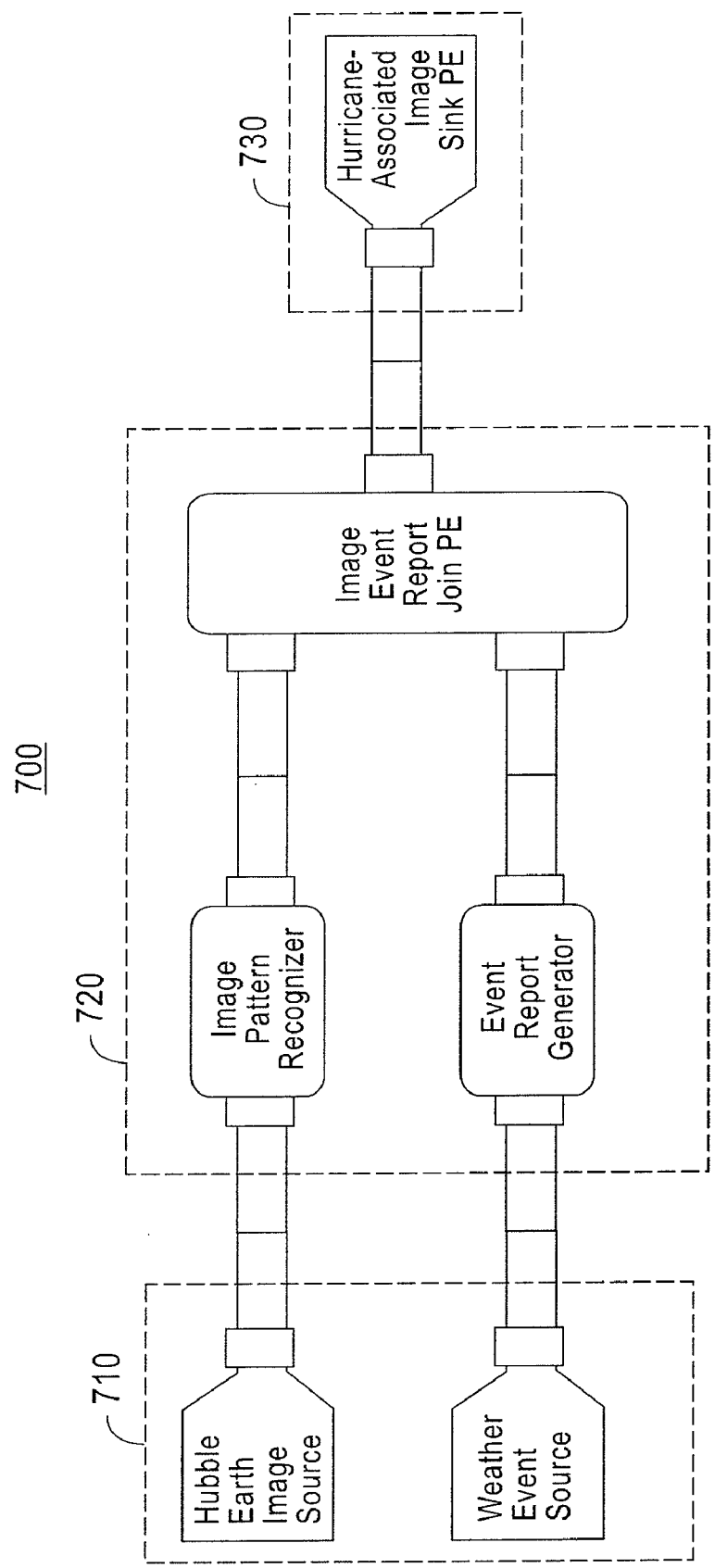
FIG. 7A illustrates a stream processing graph assembled according to an exemplary embodiment of the present invention.
Figure 7B:
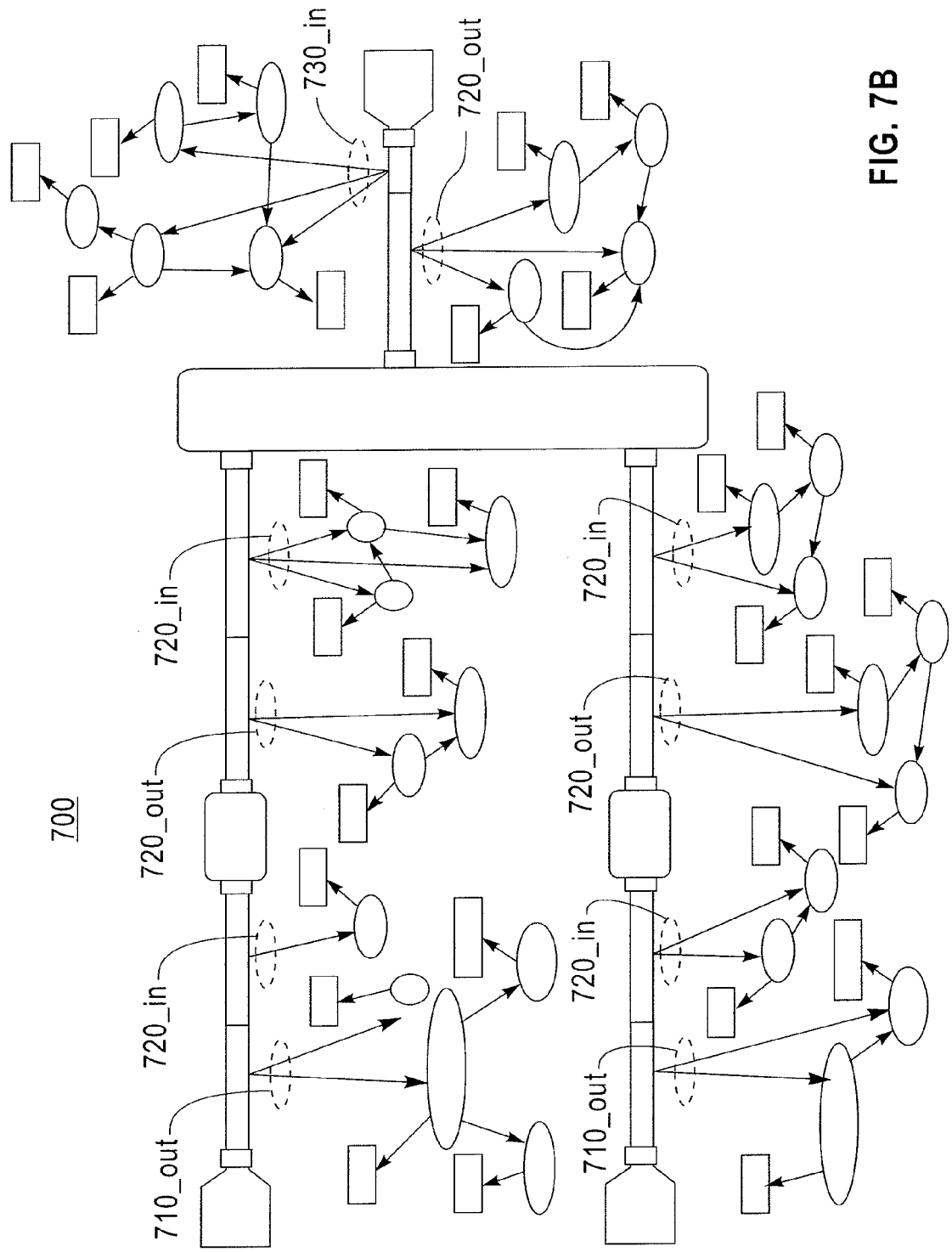
FIG. 7B illustrates the stream processing graph of FIG. 7A with semantic annotations according to an exemplary embodiment of the present invention.

An example of a stream processing graph 700 generated by the semantic planner 600 in response to a request for hurricane associated images is shown in FIG. 7A. It is to be understood that although only one processing graph is shown in FIG. 7A, the semantic planner 600 can assemble several alternative processing graphs. The processing graph 700 shown in FIG. 7A draws on two data sources 710 feeding three operators/components 720 to produce a sink including hurricane-associated images 730, for example, images that contain possible storm pattern and images that were taken around that same time a hurricane was reported. FIG. 7B depicts the same processing graph as shown in FIG. 7A; however, here, semantic graphs describing each data source's outputs 710_out, each component's inputs 720_in and outputs 720_out and the sink's inputs 730_in are provided.

As can be gleaned from a review of FIG. 7B, it can be difficult to select from among a large set of data sources and processing components to compose such a graph manually. For example, even with the relatively small number of operators depicted in the processing graph 700, the work needed to identify appropriate elements and to match outputs to inputs can be daunting, especially for matches requiring reasoning. Since most processing graphs involve many more operators, manual composition of even one graph is tedious and manual composition of multiple, alternative processing graphs is impracticable. Hence, automated compilation approaches such as planning are essential for compiling processing requests into processing graphs.

Figure 8:
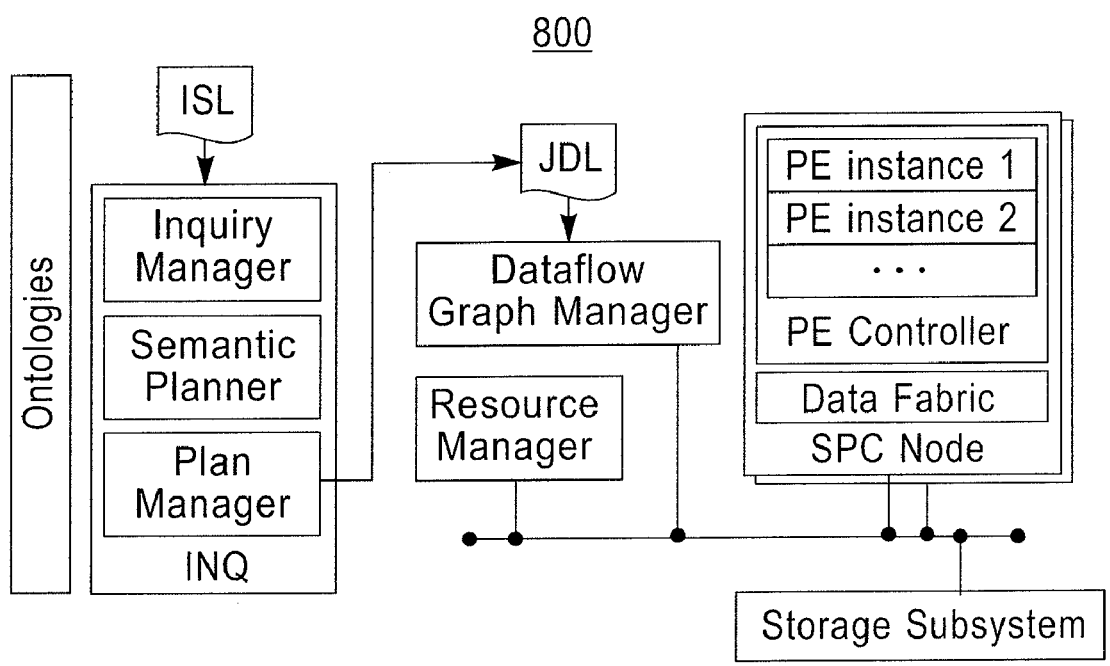
FIG. 8 illustrates a System S Stream Processing Core (SPC) in which an exemplary embodiment of the present invention may be implemented.

It is to be understood that a target environment for above referenced embodiments is a System S Stream Processing Core (SPC) 800 (see FIG. 8), which is a scalable distributed runtime for stream processing of unstructured data. The SPC 800 provides a set of components for managing stream processing applications under heavy workload. Processing graphs submitted to the SPC 800 are described in a Job Description Language (JDL), specifying the set of processing element (PE) instances to be deployed and the data stream connections between them. The runtime environment on each of the SPC nodes includes a Data Fabric for managing data flows and a PE Controller that manages execution of PEs deployed on the node. Structured and/or unstructured data is sent between the PEx, packaged in Stream Data Object (SDO) format. A Graph Manager component controls I/O channels of the data fabric, and a Resource Manager manages dynamic allocation of PE instances to nodes, subject to various resource constraints.

In accordance with an exemplary embodiment of the present invention, a means of describing processing outcomes and processing component capabilities in such a way that stream processing applications that satisfy these requests can be generated is provided. In this way, stream processing applications can be assembled more dynamically (in seconds or minutes as opposed to days or months), taking into account many more considerations (security, privacy, resource availability and consumption, etc.) than most users could fathom, let alone have the time or patience to accommodate. This automated approach makes it more practical to take into account a wide variety of constraints and to assemble multiple, alternative stream processing applications for a given outcome, and provides flexibility in choosing the best one for the given circumstances.

By using the present invention, a user describing an intended stream processing outcome need neither know nor be required to express the details of how the outcome is to be fulfilled. In fact, requiring users to convey the details of a solution can prevent an automated planner from discovering better ways of accommodating the request, better data sources to draw from, better algorithms to apply, and the assembly of more effective and/or efficient stream processing applications. Here, users need only describe their requests and convey their constraints (if any) on how the request is to be fulfilled, and an automated mechanism whereby various ways to fulfill their request can be automatically generated, compared, pruned, and applied.

By providing a means of conveying the goals for (and constraints on) a stream processing outcome and doing so using semantic descriptions built according to an explicitly represented semantic model, the user is freed up from the burden of knowing and applying some set of operators to produce some outcome. This allows the work of two different groups of people, those conveying their request and those developing and describing application components, to proceed in parallel. The present invention makes this possible by allowing the first group to convey their stream processing requests without having any knowledge of which data sources or stream processing methods are available for use. The second group can introduce new data sources or stream processing methods into the system; these can be used to produce potentially better responses to user requests, without requiring user awareness of the availability of the new sources and/or methods. In the case of information production requests, an assembled stream processing application produces as output a plurality of streams, each stream satisfying the request to produce a specified result.

It should also be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for assembling a stream processing application, comprising:
   inputting a plurality of data source descriptions, wherein each of the data source descriptions includes a graph pattern that semantically describes an output of a data source;
   inputting a plurality of component descriptions, wherein each of the component descriptions includes a graph pattern that semantically describes an input of a component and a graph pattern that semantically describes an output of the component;
   inputting a stream processing request, wherein the stream processing request includes a goal that is represented by a graph pattern that semantically describes a desired stream processing outcome;
   assembling, using a processor of a computer, a stream processing graph in response to the stream processing request, wherein the stream processing graph is assembled by using machine code executable by the computer to process the plurality of data source descriptions and the plurality of component descriptions to obtain at least one of the data sources or at least one of the components that satisfies the desired processing outcome; and
   outputting the stream processing graph.

2. The method of claim 1, wherein the graph pattern that semantically describes the output of the data source includes a description of an output capability of the data source.

3. The method of claim 1, wherein the graph pattern that semantically describes the input of the component includes a description of an input requirement of the component.

4. The method of claim 1, wherein the graph pattern that semantically describes the output of the component includes a description of an output capability of the component.

5. The method of claim 1, wherein the graph pattern that semantically describes the output of the data source is represented in an ontology description language.

6. The method of claim 1, wherein the ontology description language is Resource Description Framework (RDF) or Web Ontology Language (OWL).

7. The method of claim 1, wherein the graph pattern that semantically describes the input of the component and the graph pattern that semantically describes the output of the component are represented in an ontology description language.

8. The method of claim 7, wherein the ontology description language is RDF or OWL.

9. The method of claim 1, wherein the stream processing request further includes a constraint that is represented by a graph pattern that semantically describes constraints on the assembly of the stream processing graph.

10. The method of claim 1, further comprising:
    deploying a stream processing application embodying the at least one data source or the at least one component of the stream processing graph; and
    operating the stream processing application.

11. The method of claim 10, wherein result data is produced when operating the stream processing application.

12. The method of claim 11, wherein when the goal is a goal that requests the production of data, the stream processing request further includes a disposition that describes a means of handling the result data.

13. The method of claim 1, wherein the stream processing request is encoded in a request specification language.

14. The method of claim 1, wherein assembling the stream processing graph comprises:
    determining if an output of the data source matches an input of the component;
    connecting the data source to the component if the output of the data source matches the input of the component; and
    determining a new output for the component when the data source and the component are connected to each other.

15. The method of claim 1, wherein assembling the stream processing graph comprises:
    determining if an output of a first component matches an input of a second component;
    connecting the first component to the second component if the output of the first component matches the input of the second component; and
    determining a new output of the second component when the first and second components are connected to each other.

16. A system for assembling a stream processing application, comprising:
    a memory device for storing a program;
    a processor in communication with the memory device, the processor operative with the program to:
    receive and compile a plurality of data source descriptions, wherein each of the data source descriptions includes a graph pattern that semantically describes an output of a data source;
    receive and compile a plurality of component descriptions, wherein each of the component descriptions includes a graph pattern that semantically describes an input of a component and a graph pattern that semantically describes an output of the component;
    receive and compile a stream processing request, wherein the stream processing request includes a goal that is represented by a graph pattern that semantically describes a desired stream processing outcome;
    assemble a stream processing graph in response to the stream processing request, wherein the stream processing graph is assembled by using the plurality of data source descriptions and the plurality of component descriptions and includes at least one of the data sources or at least one of the components that satisfies the desired processing outcome; and
    output the stream processing graph.

17. The system of claim 16, wherein the graph pattern that semantically describes the output of the data source includes a description of an output capability of the data source.

18. The system of claim 16, wherein the graph pattern that semantically describes the input of the component includes a description of an input requirement of the component.

19. The system of claim 16, wherein the graph pattern that semantically describes the output of the component includes a description of an output capability of the component.

20. The system of claim 16, wherein the graph pattern that semantically describes the output of the data source is represented in an ontology description language.

21. The system of claim 16, wherein the ontology description language is Resource Description Framework (RDF) or Web Ontology Language (OWL).

22. The system of claim 16, wherein the graph pattern that semantically describes the input of the component and the graph pattern that semantically describes the output of the component are represented in an ontology description language.

23. The system of claim 22, wherein the ontology description language is RDF or OWL.

24. The system of claim 16, wherein the stream processing request further includes a constraint that is represented by a graph pattern that semantically describes constraints on the assembly of the stream processing graph.

25. The system of claim 16, wherein the processor is further operative with the program to:
deploy a stream processing application embodying the at least one data source or the at least one component of the stream processing graph; and
operate the stream processing application.

26. The system of claim 25, wherein result data is produced when operating the stream processing application.

27. The system of claim 26, wherein when the goal is a goal that requests the production of data, the stream processing request further includes a disposition that describes a means of handling the result data.

28. The system of claim 16, wherein the stream processing request is encoded in a request specification language.

29. The system of claim 16, wherein the processor is further operative with the program when assembling the stream processing graph to:
determine if an output of the data source matches an input of the component;
connect the data source to the component if the output of the data source matches the input of the component; and
determine a new output for the component when the data source and the component are connected to each other.

30. The system of claim 16, wherein the processor is further operative with the program when assembling the stream processing graph to:
determine if an output of a first component matches an input of a second component;
connect the first component to the second component if the output of the first component matches the input of the second component; and
determine a new output of the second component when the first and second components are connected to each other.

31. A computer program product comprising a computer useable medium having computer program logic recorded thereon for assembling a stream processing application, the computer program logic comprising:
program code for receiving and compiling a plurality of data source descriptions, wherein each of the data source descriptions includes a graph pattern that semantically describes an output of a data source;
program code for receiving and compiling a plurality of component descriptions, wherein each of the component descriptions includes a graph pattern that semantically describes an input of a component and a graph pattern that semantically describes an output of the component;
program code for receiving and compiling a stream processing request, wherein the stream processing request includes a goal that is represented by a graph pattern that semantically describes a desired stream processing outcome; and
program code for assembling a stream processing graph in response to the stream processing request, wherein the stream processing graph is assembled by using the plurality of data source descriptions and the plurality of component descriptions and includes at least one of the data sources or at least one of the components that satisfies the desired processing outcome.

* * * * *